(No Model.)
5 Sheets—Sheet 1.
E. B. HAYES.
GANG BIT BORING MACHINE.
No. 314,124. Patented Mar. 17, 1885.
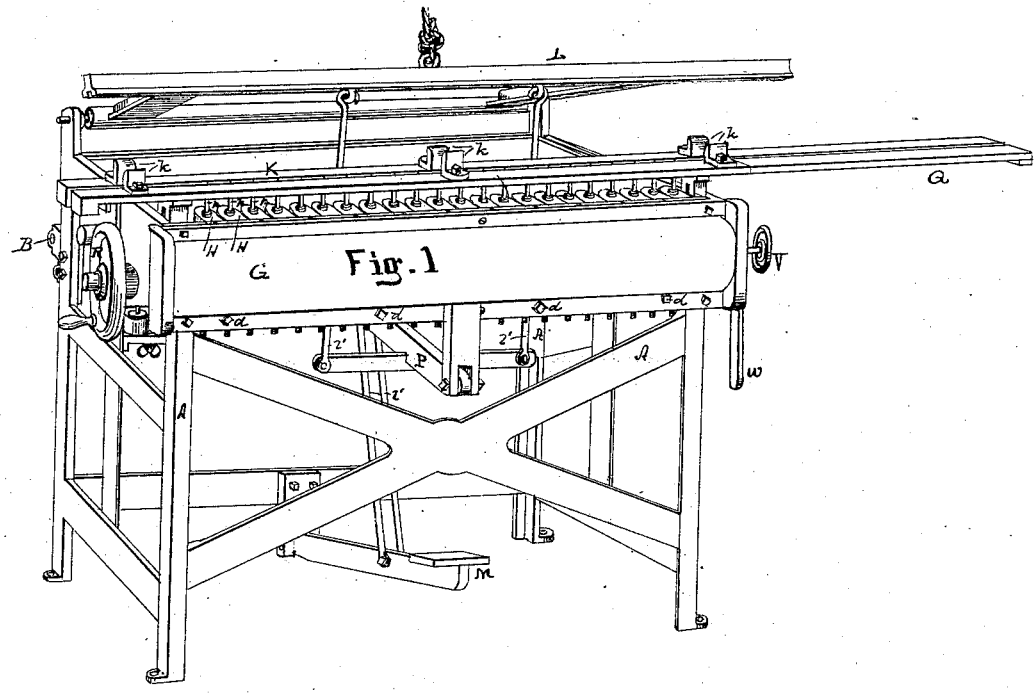
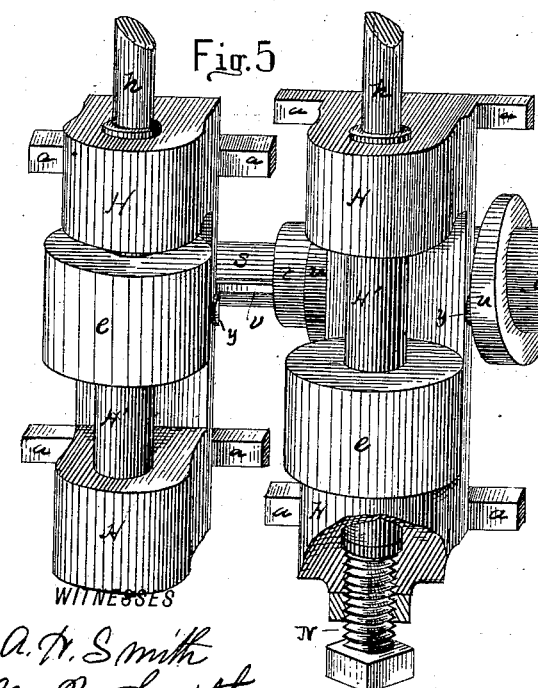
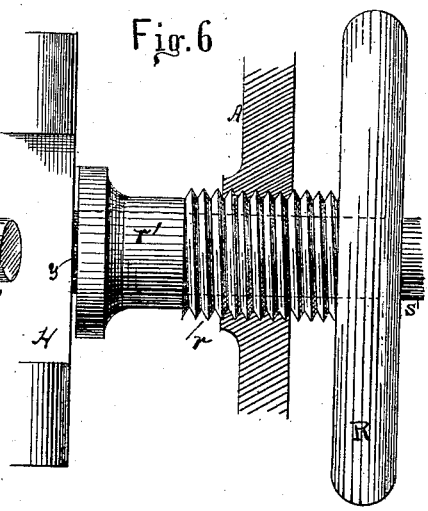

(No Model.) 5 Sheets—Sheet 2.
E. B. HAYES.
GANG BIT BORING MACHINE.

No. 314,124. Patented Mar. 17, 1885.

WITNESSES
A. H. Smith
M. V. Smith

INVENTOR
E. B. Hayes
By his Attorney
R. D. O. Smith (No Model.) 5 Sheets—Sheet 3.

E. B. HAYES.
GANG BIT BORING MACHINE.

No. 314,124. Patented Mar. 17, 1885.

WITNESSES
A. H. Smith
M. V. Smith

INVENTOR
E. B. Hayes
By his Attorney
R. W. Smith (No Model.) 5 Sheets—Sheet 4.

E. B. HAYES.
GANG BIT BORING MACHINE.

No. 314,124. Patented Mar. 17, 1885.

WITNESSES:
A. H. Smith
M. V. Smith

INVENTOR
E. B. Hayes
BY
his ATTORNEY (No Model.) 5 Sheets—Sheet 5.
E. B. HAYES.
GANG BIT BORING MACHINE.
No. 314,124. Patented Mar. 17, 1885.
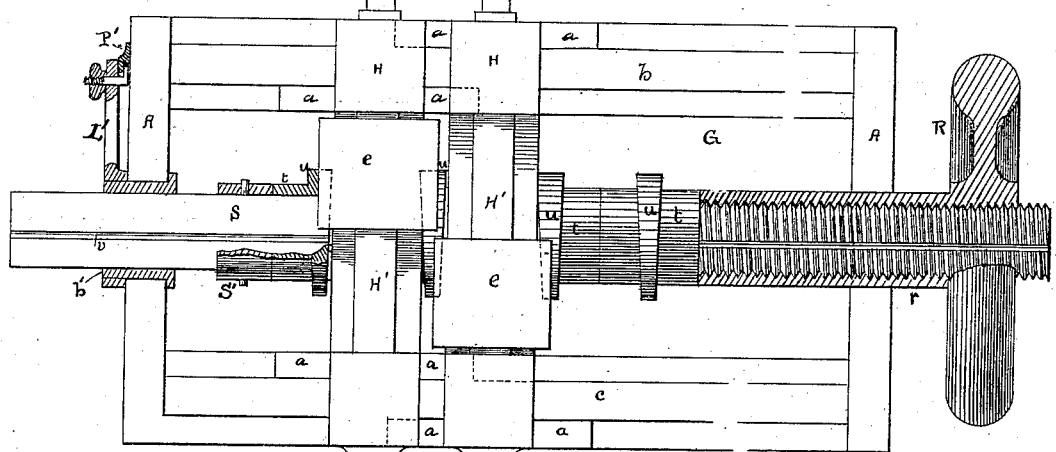
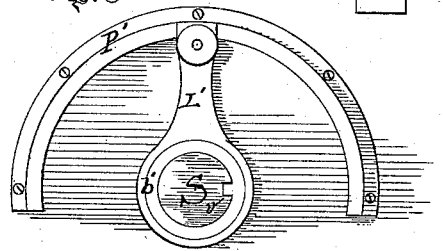
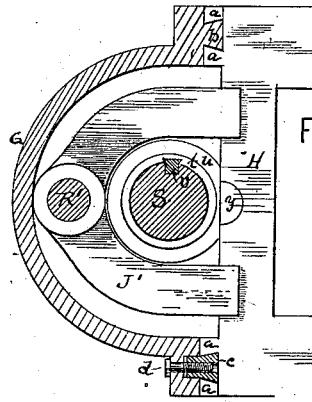
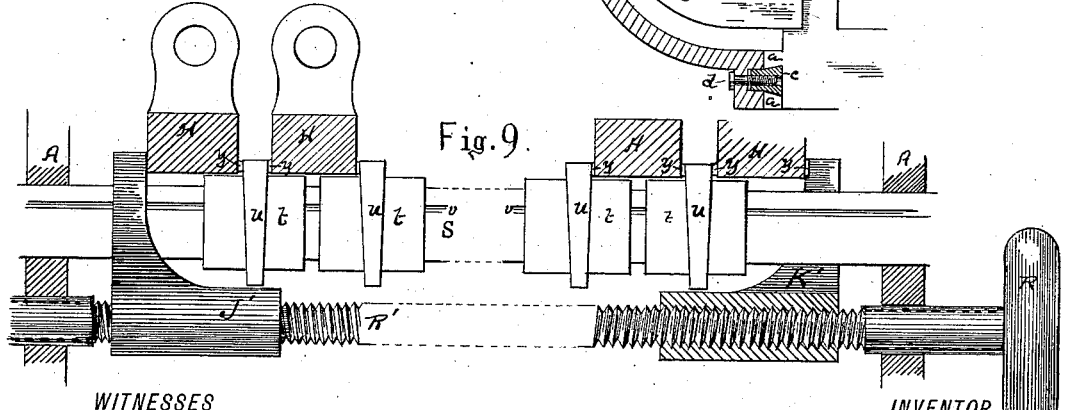
WITNESSES
A. H. Smith
M. V. Smith
INVENTOR
E. B. Hayes
By his Attorney
R. D. Smith

UNITED STATES PATENT OFFICE.

ELI B. HAYES, OF BIG RAPIDS, MICHIGAN.

GANG-BIT BORING-MACHINE.

SPECIFICATION forming part of Letters Patent No. 314,124, dated March 17, 1885.

Application filed December 30, 1884. (No model.)

*To all whom it may concern:*

Be it known that I, ELI B. HAYES, of Big Rapids, in the county of Mecosta and State of Michigan, have invented new and useful Improvements in Gang-Bit Boring-Machines adapted to boring blind-stiles and for other purposes; and I do hereby declare that the following is a full and accurate description of the same.

My invention relates, first, to devices for automatically spacing the bits, and adjusting said spacing with uniformity whenever it is necessary to change said spacing; second, to the method of belting, whereby all of the spindles are driven by a single continuous belt; third, to the arrangement of the guides alternately inside and outside, so that they are enabled to lap past each other; fourth, to an adjustable gib whereby all the wear in the guides may be taken up; fifth, to devices for clamping the spindle-heads; sixth, to devices for clamping and straightening the stiles while being bored, and to other things of minor importance, which will be fully described hereinafter, reference being had to the accompanying drawings, wherein—

Figure 2:
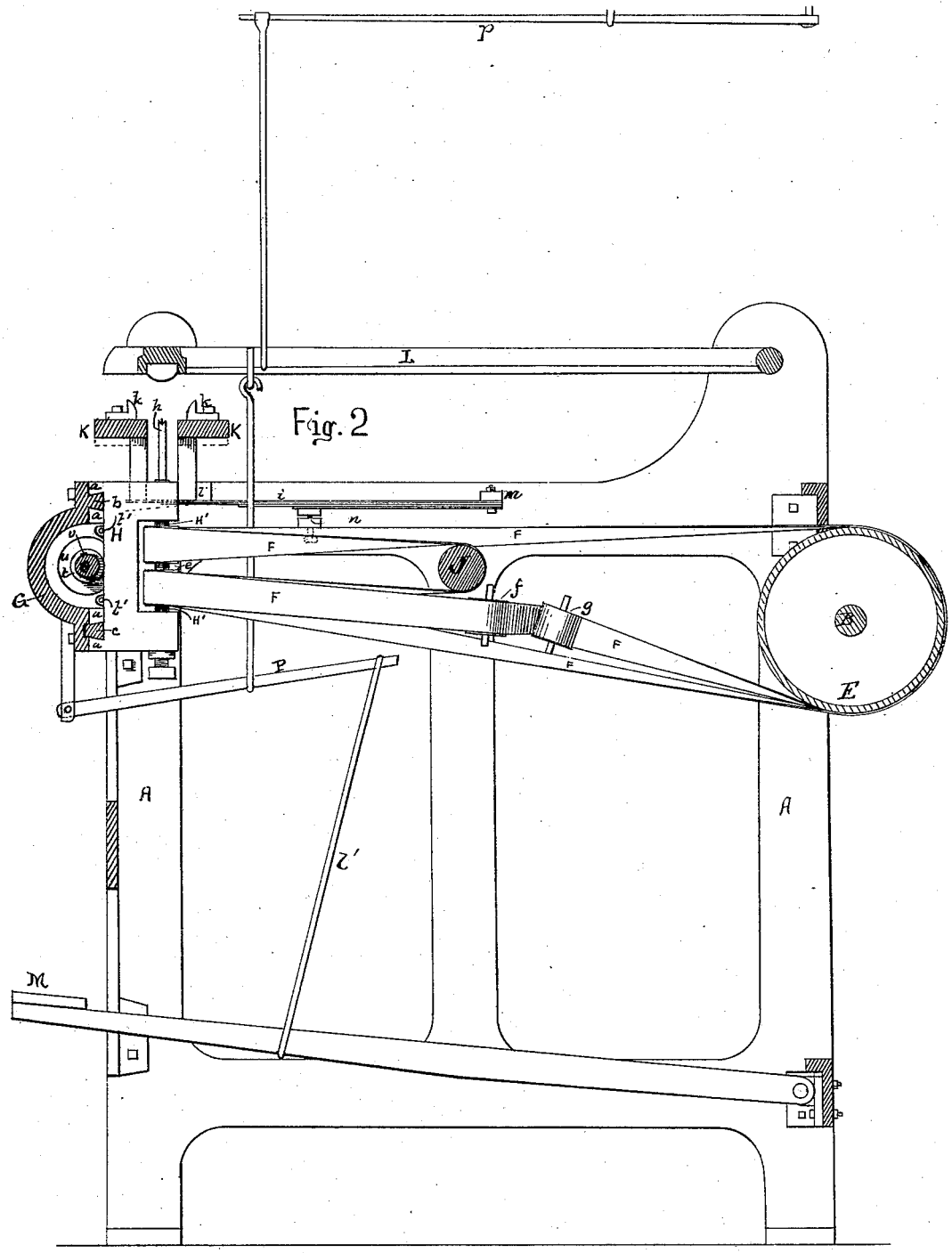
Figure 3:
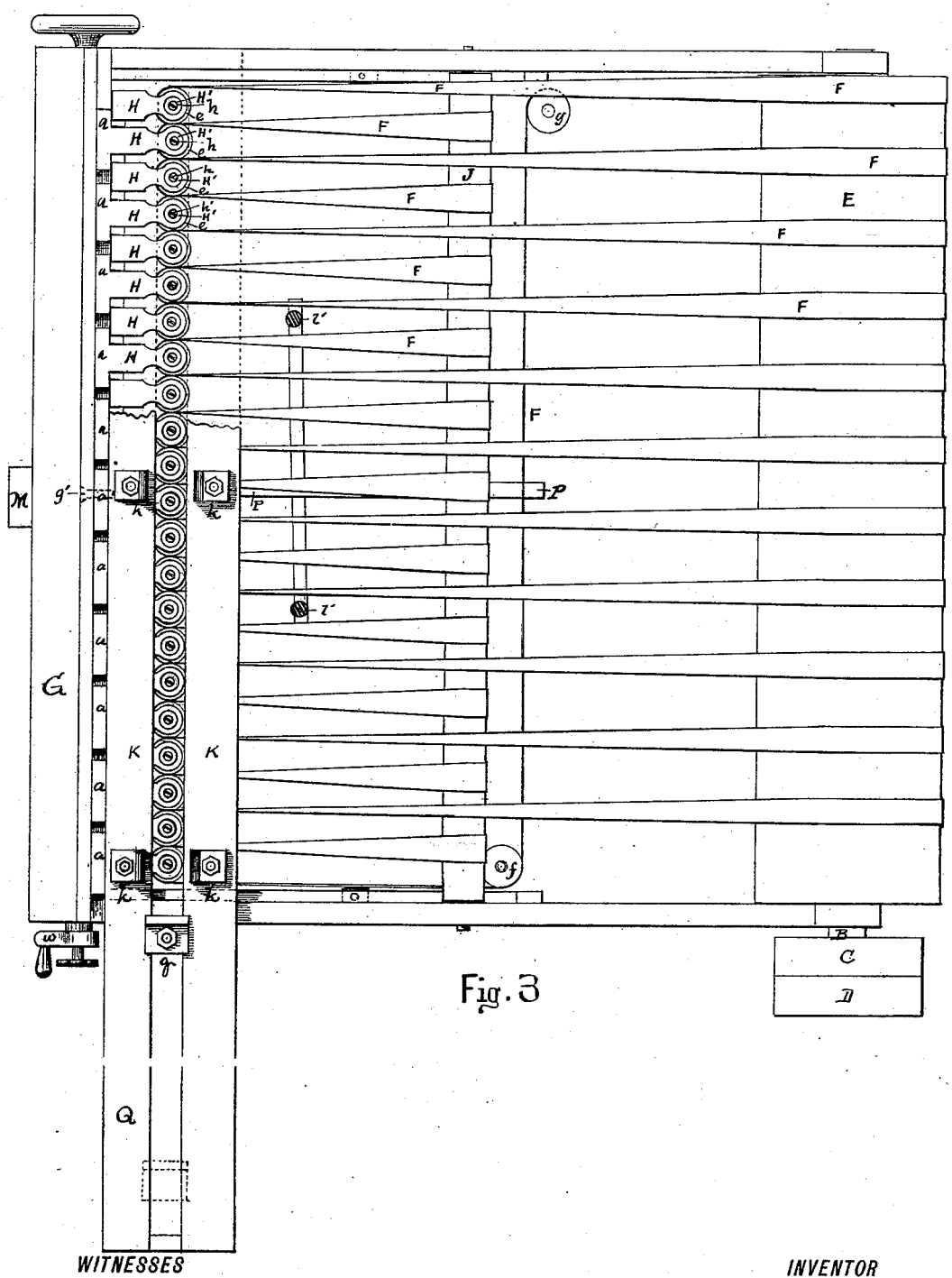
Figure 4:
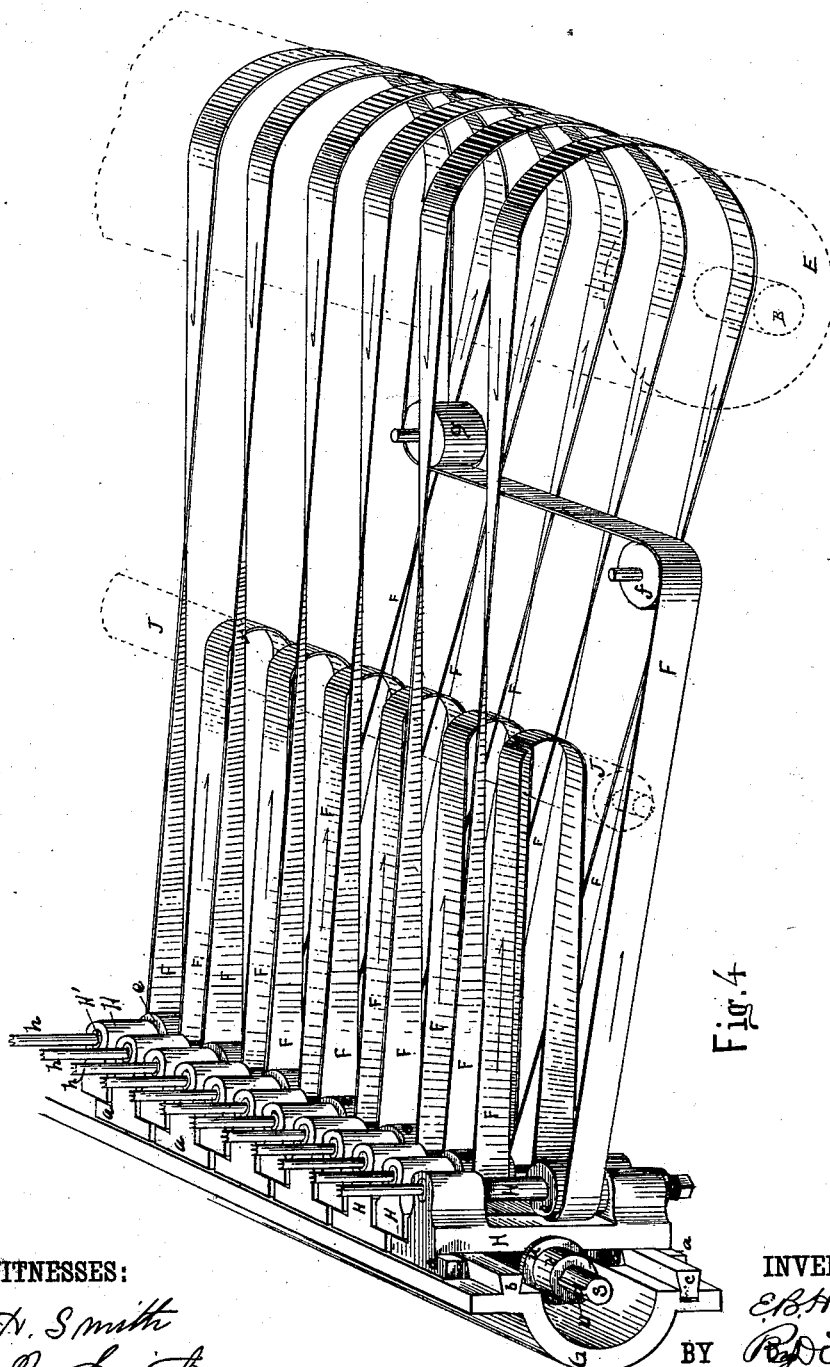

Figure 1 is a perspective view of my machine. Fig. 2 is a longitudinal vertical section of my machine. Fig. 3 is a plan of the same. Fig. 4 is a perspective view of the belt scheme. Fig. 5 is a perspective of two spindle-heads and spacing-wedges. Fig. 6 is an elevation, showing a mode of clamping the heads. Figs. 7, 8, 9, 10 represent different modes of clamping the heads.

Many of the devices described herein are adapted to use in other machines having analogous arrangements and modes of motion, and I therefore do not desire to be confined to the details of structure and use shown and described, as it will appear evident to skilled persons that the same may be changed without changing the mode of operation. For convenience, therefore, I will confine my description to a machine for boring blind-stiles, that being the purpose of the working machine which I have built.

The main frame A is made of iron or wood, as preferred, but the former is most desirable. The legs rest upon the floor and are secured thereto. A main driving-shaft, B, is placed in boxes attached to said frame at the rear side of the machine, and said shaft is provided with a driving-pulley, C, and also with an idler or loose pulley, D, if desired. The shaft B is also provided with a number of spindle-driving pulleys; but they may advantageously be made as a drum, E, around which the belt F may pass as often as may be required. At the front side of the frame the head or guide G is securely bolted, and the laterally-adjustable spindle-heads H are mounted thereon. Each spindle H is provided with a removable boring-bit, $h$. Above the series of boring-bits there is a slotted table, K, capable of movement up or down, and when depressed the boring-bits $h$ project through the slot in said table to a distance determined by the range of motion permitted to the table K. The blind-stile is placed on the table K between suitable guides, and said table and stile being thereafter depressed the bits penetrate the stile and bore all the required holes therein to a uniform depth.

The above is a general description of my machine, and I will now describe particularly the several devices which constitute the invention.

As is well known, there is great variation in the length of windows, and this variation can only be fully met either by changing the spacing of the slats or by changing the width of the end rails. This last is objectionable, because it renders the blind too heavy, both in fact and in appearance, when the variation does not divide evenly as to the ordinary spacing. It is therefore the general custom to change the spacing for the slat-pivots, so as to cause a certain number of slats to properly occupy the space.

One part of my invention relates to devices whereby the positions of the several bits may be simultaneously and automatically changed without changing the uniform equality of the spacing.

It is evident that from the starting-point the ratio of motion of each spindle-head must be added to the actual motion of each and all the preceding spindle-heads. While the first one may be moved only one-eighth of an inch, the second one will be moved two-eighths, and so on. To accomplish this end most easily and readily I employ a series of wedges of uniform taper, which, being driven equal distances between the spindle-heads, separate them uniformly, and I find it preferable to make said wedges circular and to mount them on a shaft, whereby they may be simultaneously and uniformly rotated, rather than on a frame or rod having a rectilinear movement. I therefore place the shaft S in suitable bearings in the head G, and provide said shaft with a longitudinal spline or feather, $v$. The circular wedges $u$ have each a hub, $t$, equal in length to the width of the spindle-head H, and each of said hubs is fitted to slide on the spline or feather $v$, so that they may freely travel endwise on said shaft, but are compelled to rotate with it. One of the circular wedges $u$ is placed between each pair of spindle-heads H, and therefore whenever said shaft is caused to rotate, said wedges are forced to enter between or to recede from between the spindle-heads and either force them farther apart or permit them to come closer together; but in every event the several spindles will be uniformly separated and spaced. When the spindle-heads have been adjusted, they must be clamped in place, and this may be done by many devices, of which I show three in Figs. 6, 7, 8, 9, 10.

In Fig. 6 the shaft S is shown passing through a hollow screw, $r$, for an end bearing. The end of said screw, or an interposed sleeve, $r'$, butts against the outermost spindle-heads, H, and after said heads have been adjusted the screw $r$ is revolved by means of the hand-wheel R and the heads H forced toward each other. A similar arrangement at the opposite end may be employed; or, as shown in Fig. 7, a screw-thread may be cut on shaft S and the screw $r$ provided with an interior screw-thread. A collar, S', being permanently fastened to said shaft at the other end, the end movement of said shaft effects the clamping of the heads H. The end of shaft S opposite the nut $r$ may pass through a sleeve-bearing, $b'$, having a feather fitting the spline $v$, and a lever, L', whereby the sleeve-bearing $b'$ and shaft S may be rotated to move the spacing-wedges; and, if desired, said lever may be provided with a stationary segment, P', and a clamp to hold it in adjusted position.

In Figs. 9 and 10 a clamp having two movable jaws, J' K', mounted upon and operated by a rod, R', is shown. These jaws may be operated by right and left hand screws cut on said rod, as shown; or, if preferred, the jaw J' may be secured permanently to the rod R' and the jaw K' be fitted to slide on said rod, and a screw-sleeve like that shown in Fig. 7 may be employed.

In Fig. 1 the lever $w$ is attached to the shaft S, to rotate it as desired, and the hand-wheel V operates the clamp at that end, while the wheel R operates the clamp at the opposite end.

In order to secure a bearing or contact point between the spindle-head H and the rotating wedge which shall be uniform in location, I place on each side of said head H a projection, $y$, against which the wedge always makes contact, and thereby insures that the contacts shall all be in line. The ordinary number of slats employed is twenty-two, and I prefer to fasten one of the middle spindle-heads, H, permanently to the head G, and the gross movement of the outermost spindle-heads is thereby divided between the two ends, instead of taking place entirely at one end. Each spindle-head is provided with two bearing-boxes in line for the spindle H', and at each end transversely across the bottom of the spindle-head there is a rib or guide, $a$, which projects laterally from the head sufficiently far to make its entire length equal to twice the width of said head. These ribs or guides $a$ are placed alternately at the ends, and a little way in from the ends of the spindle-heads, so that they not only lap past each other, as shown, but admit between them the dovetailed gibs $b\ c$, which are attached to the head G and constitute the guides and attachments for the spindle-heads H, the outer set of guides $a$ moving on the outer sides of said gibs, and the inner set of guides $a$ moving on the inner sides of said gibs. The gib $c$ is made separate from the head G, and is fitted into a groove in the same and fastened there by a suitable number of screws, $d$, whereby the gib $c$ may be drawn down into its groove when required, and by this adjustment it will be observed both outside and inside guides $a$ are tightened up. Each spindle H' is provided with a pulley, $e$, and said pulleys are arranged alternately near the upper and lower ends of said spindles, so that they may overlap each other and be larger in diameter than the width of the spindle-head. This arrangement of the pulleys in parallel series also enables me to drive the whole set in the same direction with a single continuous belt. The scheme of belting is shown in Fig. 4, the drum E and the idler-drum J being shown in dotted line. Each convolution of the belt from the drum E outward and return passes it around two pulleys, $e$, and the idler-drum J. In the figure the distant convolutions are obscured by the nearer convolutions; but the several convolutions are duplicates, and all may be understood by examination of one.

From the top of the drum E the belt F passes to and around the uppermost pulley, $e$, and thence over the idler J, from the under side of which it passes in proper direction to and around the adjacent lowermost pulley, $e$, and it then returns to the under side of the drum E and again passes from the upper side, as before, and so on until the last pulley in the series has been reached, and it thence passes by way of the guide-pulleys $f\ g$ to the place of beginning.

It has been customary in belting a gang of spindles to employ separate belts for each spindle, and it is evident that there will be many more repairs to make, and that it is impossible to run a series of belts with the same tension throughout, whereas by my scheme there is but a single belt to be laced or repaired, the tension on all the pulleys is the same, and with the exception of pulley $g$ the same side of the belt is against every pulley in its course. This is a point of considerable importance to the durability of the belt. The slotted table K is supported upon springs or counter-weights, so as to yield downwardly under pressure and return to its initial position when released, being also provided with suitable guides, which may be like the guide-lugs $l$, or otherwise arranged, as preferred. I prefer to support said table upon strong leaf-springs $i$, placed inside the frame A, and supported upon lugs $m$ and adjusting-screws $n$. Guides $k\ k$ are attached to the top of said table to receive and hold the stile centrally over the slot and line of boring-bits $h$. Said guides are adjustable to adapt them to stiles of different thicknesses, and at one end said table has an extension, Q, to support stiles of unusual length, which cannot be bored all at once with an ordinary gang of bits. This extension is made of wood, by preference, to avoid extra weight to be carried by the table. A movable gage-stop, $q$, is employed to gage the proper position of the end of the stile when placed on the table K. The stiles are frequently more or less crooked, and require to be straightened before being bored. To accomplish this a frame, L, is employed, hinged to the rear side of the frame A, and supported by an overhead spring, $p$, or otherwise, as preferred. When depressed, the front edge of said frame descends upon the upper edge of the stile and clamps it upon the table K, and then forces both stile and table downward until the bits have penetrated the stile to the desired depth. The springs $i$ are set with tension sufficient to insure the straightening of the stiles before being moved to the bits $h$.

To operate the frame L and table K, I employ a treadle, M, which may be coupled directly to the frame L by means of a stirrup-rod, $l'$; but I prefer to interpose a compound lever, P, and thereby increase the available power of the weight upon the treadle. Each spindle $h$ has below it an adjusting step-screw, N, whereby it may be adjusted endwise to bring the points of all the bits exactly in line. Movable dies are placed on the frame L, or on the table K, or on both, to mark the positions of the mortises by the same act which feeds the stile to the boring-bits.

Having described my invention, I claim—

1. A gang of boring-bits, each of which is mounted on a laterally-adjustable head, combined with a series of wedges located between but independent of said heads, and a device whereby said wedges may be simultaneously advanced or withdrawn to vary the spacing of said heads uniformly, as set forth.

2. A gang of boring-bits, each of which is mounted on a laterally-adjustable head, combined with a series of wedges located between said heads and laterally adjustable upon a carriage independent of the heads and the carriage whereon said heads are moved, said wedges being also simultaneously advanced or withdrawn, and held in position to vary and determine the spacing of said bits, as set forth.

3. A gang of boring-bits, each of which is mounted on a laterally-adjustable head, combined with a series of circular wedges mounted on and supported by a shaft capable of rotation, and free to slide laterally on said shaft, said wedges being located between said heads to vary and determine the spacing of the same, as set forth.

4. A gang of boring-bits driven by spindles provided with pulleys set alternately high and low, as set forth, combined with a driving-pulley, an idler between said driving and driven pulleys, over which the belt passes from the high pulley to the adjacent low pulley, and guide-pulleys $f\ g$, also between said driving and driven pulleys, whereby the belt is returned to the place of beginning.

5. A gang of laterally-adjustable spindle-heads provided with pulleys alternately near the upper and lower ends of said spindles, and a continuous belt, F, combined with a driving-drum, E, an idler-drum, J, and guide-pulleys $f\ g$, located between said spindle-heads and driving-drum, whereby, when the spindle-heads are laterally adjusted, the belt will automatically readjust itself on said drums.

6. The head G, with the parallel dovetailed gibs, combined with the spindle-heads H, provided with guides to engage and slide upon said gibs, said guides being so attached that said heads alternately will have guides inside and outside of said gibs, whereby said guides may lap past each other, for the purpose set forth.

7. The heads H, provided with transverse guides $a$, so attached that said heads alternately will have guides adapted to lap past each other, with a space between, as set forth, combined with the head G, provided with the parallel gibs $b$ and $c$, adapted to fit the space between said lapping guides, the gib $c$ being adjustable to tighten all the guides $a$, as set forth.

8. In a gang boring-machine having a series of laterally-adjustable spindle-heads, whereof one at or near the center is fixed in position, and a series of adjusting-wedges between the same to determine and regulate uniformly the spacing of the boring-bits, combined with a double-acting clamp, whereby the spindle-heads may all be forced toward the stationary head and against the spacing-wedges, as set forth.

9. In a gang boring-machine having laterally-adjustable spindle-heads, and a series of adjustable wedges between said spindle-heads to determine and regulate uniformly the spacing of the boring-bits, combined with the clamping-forks $s$, rod $t$, and nut $r$, for the purpose set forth.

10. In a gang boring-machine having laterally-adjustable boring-bits, combined with a slotted table, K, located above said bits, guides $k$ upon the same, and a pivoted frame, L, to clamp and straighten the stile and present it to the bits, as set forth.

11. In a gang boring-machine having a series of equally-spaced laterally-adjustable spindles, and boring-bits carried by said spindles, a slotted table, K, springs $i$, supporting said table, a swinging frame, L, to clamp and straighten the stile upon the table K, and an operative treadle, M, attached to said frame L.

ELI B. HAYES.

Witnesses:
STEPHEN V. R. HAYES,
S. J. REYNOLDS.